United States Patent
Weissenburger

[15] 3,676,429
[45] July 11, 1972

[54] IMINO COMPOUNDS OF PENICILLINS AND SILYL ESTERS THEREOF

[72] Inventor: Helmut Wilhelm Otto Weissenburger, Rijswijk, Netherlands

[73] Assignee: Koninklijke Nederlandsche Gist-en Spiritusfabriek NV, Delft, Netherlands

[22] Filed: July 16, 1969

[21] Appl. No.: 842,344

Related U.S. Application Data

[63] Continuation-in-part of Ser. No. 681,002, Nov. 6, 1967, Pat. No. 3,499,909, which is a continuation-in-part of Ser. No. 622,907, March 14, 1967, abandoned.

[30] Foreign Application Priority Data

May 18, 1966   Netherlands...........................6606872

[52] U.S. Cl. ............................................................260/239.1
[51] Int. Cl. ...........................................................C07d 99/16
[58] Field of Search..............................................260/239.1

[56] References Cited

UNITED STATES PATENTS

3,249,622   5/1966   Herrling et al......................260/239.1
3,304,301   2/1967   Vanderhaeghe et al............260/239.1

*Primary Examiner*—Nicholas S. Rizzo
*Attorney*—Hammond & Littell

[57] ABSTRACT

Novel imino chlorides or bromides of silyl esters of penicillin compounds which are useful intermediates for the preparation of 6-amino-penicillanic acid and its derivatives.

10 Claims, No Drawings

IMINO COMPOUNDS OF PENICILLINS AND SILYL ESTERS THEREOF

PRIOR APPLICATIONS

The present application is a continuation-in-part application of co-pending, commonly assigned application Ser. No. 681,002, filed Nov. 6, 1967, now U.S. Pat. No. 3,499,909, which in turn is a continuation-in-part of co-pending, commonly assigned application Ser. No. 622,907, filed Mar. 14, 1967, now abandoned.

PRIOR ART

NATURE, (Vol. 195, 1962, page 1000) discloses that alkaline hydrolysis of penicillins results in the formation of the corresponding penicilloic acids. With certain penicillins, alkaline hydrolysis may also split off the side chain and under certain conditions up to 1 percent of these penicillinS may be converted into 6-amino-penicillanic acid. For example, storage of a 1 percent solution of phenoxymethylpenicillanic acid in a 0.05 molar phosphate buffer solution at a pH of 8.5 and 70° C results in a 0.5 percent yield of 6-aminopenicillanic acid. Benzyl-penicillin treated in the same way results in a yield of less than 0.03 percent 6-aminopenicillanic acid.

6-aminopenicillanic acid has been prepared by microbiological methods up to the present, but these methods suffer certain disadvantages since infection may occur with penicillinase-forming organisms which break the penicillin down into penicilloic acids. Therefore, continuous commercial production thereof is not feasible. Moreover, it is necessary to work in very dilute solutions and the 6-aminopenicillanic acid formed must be separated from large amounts of water which contain foreign substances, due to the microbiological conversion, particularly enzymes and other proteins, which have to be removed to avoid contamination of the 6-amino-penicillanic acid.

U.S. Pat. No. 2,746,956 discloses silyl esters of penicillin which change undesirable properties thereof without affecting the biological properties.

OBJECTS OF THE INVENTION

It is an object of the invention to provide novel imino halides of penicillins.

It is a further object of the invention to provide novel imino ethers of penicillins.

These and other objects and advantages of the invention will become obvious from the following detailed description.

THE INVENTION

The novel imino penicillin compounds of the invention have the formulas

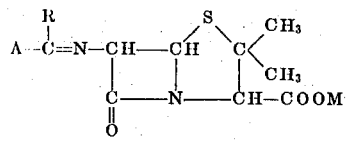

and

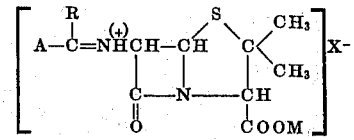

wherein A is an organic carboxylic acid radical devoid of the carboxyl group of preferably one to 18 carbon atoms, R is selected from the group consisting of halogen and OR′, R′ is the residue of an alcohol, M is a silyl ester group when R is halogen and hydrogen when R is OR′ and X is an anion of an acid. If R′ is the residue of a polyvalent alcohol, the hydroxyl groups are partially or wholly substituted by an imino compound of a penicillin.

The said novel products are useful as intermediates for the preparation of 6-amino penicillanic acid and its derivatives with yields up to 85 to 95 percent or higher, especially if the reaction is effected at unusually low temperatures of below −20° C during formation of the imino ether to avoid side reactions.

Silyl esters are used for blocking the carboxyl group of the penicillins and the formation thereof is effected by reacting under anhydrous conditions a silyl compound such as a halogen silane or amino silane with a free carboxylic compound or a salt thereof in the presence of an acid binding agent. Examples of suitable salts of penicillins which may be used are alkali metal and alkaline earth metal salts such as potassium, sodium, calcium, etc.; ammonium salt, metal salts such as aluminum; amine salts such as trialkyl amines such as triethylamine, procaine, dibenzylamine, N-benzyl-β-phenethylamine, 1-ephenamine, N,N′-dibenzylethylenediamine, dehydroabietylamine, N-lower alkyl-piperidines such as N-ethylpiperidine, N-benzyl-dehydroabietylamine, etc. Preferably tertiary amine salts are used.

Examples of suitable silyl compounds are trimethyl chlorosilane, hexamethyl disilazane, triethyl chlorosilane, methyl trichlorosilane, dimethyl dichlorosilane, triethyl bromosilane, tri-n-propyl chlorosilane, bromomethyl dimethyl chlorosilane, tri-n-butyl chlorosilane, methyl diethyl chlorosilane, dimethyl ethyl chlorosilane, phenyl dimethyl bromosilane, benzyl methyl ethyl chlorosilane, phenyl ethyl methyl chlorosilane, triphenyl chlorosilane, triphenyl fluorosilane, tri-o-tolyl chlorosilane, tri-p-dimethylaminophenyl chlorosilane, N-ethyl triethyl silylamine, hexaethyl disilazane, triphenyl silylamine, tri-n-propyl silylamine, tetraethyl dimethyl disilazane, tetramethyl diethyl disilazane, tetramethyl diphenyl disilazane, hexaphenyl disilazane, hexa-p-tolyl disilazane, etc. The same effect is produced by hexa-alkylcyclotrisilazanes or octa-alkyl-cyclotetrasilazanes. Other suitable silylating agents are silylamides and silylureides such as trialkylsilylacetamide and a bis-trialkylsilylacetamide.

The reactive acid halide is preferably selected from the group consisting of phosphorus pentachloride, phosphorus pentabromide, phosphorus tribromide, oxalyl chloride, p-toluene sulfonic acid chloride, phosphorus oxychloride, phosgene, etc., under anhydrous conditions in the presence of acid binding agents at temperatures preferably below 0° C such as −10 to −40° C. The formation of the imino halide is preferably effected in an inert organic solvent such as methylene chloride, dichloroethane, chloroform, tetrachloroethane, nitromethane, diethyl ether, etc.

Examples of suitable acid binding agents are tertiary amines such as triethylamine, dimethylaniline, quinoline, lutidine, pyridine. The amount of tertiary amine used is preferably such that only a portion of the acid thus formed is bound. For example, the amount of tertiary amine for PCl₅ and a small excess of acid-forming halogeno-silane derivative may be less than four equivalents, preferably less than three equivalents, whereby no separate hydrolysis is required.

A very important step for the high yields is the formation of the imino ether by reacting the imino halide with a primary or secondary alcohol at temperatures between −20° and −60° C, preferably about −40° C. Temperatures higher than −20° C. give a substantial reduction in yield, i.e., 15 percent or more at temperatures about 0° C with penicillin G.

Examples of suitable alcohols for forming the imino ethers are primary and secondary alcohols having the general formula $R_6OH$ in which $R_6$ is selected from the group consisting of (A) alkyl having one to 12 carbon atoms, preferably at least three carbon atoms, such as methanol, ethanol, propanol, isopropanol, n-butanol, amylalcohol, decanol, etc.; (B) phenylalkyl having one to seven alkyl atoms, such as benzylalcohol, 2-phenylethanol-1 etc.; (C) cycloalkyl, such as cyclohexylalcohol, etc.; (D) hydroxyalkyl having two to 12 carbon atoms, preferably having two to eight carbon atoms, such as ethylene glycol, 1,4-butanediol,1,6 hexanediol, etc.; (E) alkoxyalkyl having three to 12 carbon atoms, such as 2-methoxyethanol, 2-isopropoxyethanol, 2-butoxyethanol, etc.; (F) aryloxyalkyl having two to seven carbon atoms in the aliphatic chain such as 2-p-chlorophenoxyethanol, etc.; (G) aralkoxyalkyl having three to seven carbon atoms in the aliphatic chain, such as 2-(p-methoxybenzyloxy)-ethanol, etc.; (H) hydroxyalkoxyalkyl having four to seven carbon atoms, such as diglycol. Also, mixtures of these alcohols are suitable for forming the imino ethers. Alcohols having at least one primary OH group are preferred.

Examples of suitable 6-acylamino-penicillanic acids are penicillin G, penicillin F, penicillin K, penicillin N, penicillin V, penicillin O, penicillin S, penicillin X, etc. Other known penicillins are disclosed in U.S. Pat. Nos. 2,941,995, 2,951,839, 2,996,501, 3,007,920, 3,025,290, 3,035,047, 3,040,032, 3,040,033, 3,041,332, 3,041,333, 3,043,831, 3,053,831, 3,071,575, 3,071,576, 3,082,204, 3,093,547 and 3,093,633.

Examples of suitable organic carboxylic acids for the acylamino acids are alkanoic acids, such as formic acid, acetic acid, propionic acid, butyric acid, isobutyric acid, valeric acid, isovaleric acid, trimethyl acetic acid, caproic acid, β-trimethyl propionic acid, heptanoic acid, caprylic acid, pelarginic acid, capric acid, undecylic acid, lauric acid, myristic acid, palmitic acid and stearic acid; alkenoic acids, such as undecylenic acid and oleic acid; cycloalkyl carboxylic acids, such as cyclopentyl carboxylic acid, cyclopropyl carboxylic acid, cyclobutyl carboxylic acid and cyclohexyl carboxylic acid; cycloalkyl alkanoic acids, such as cyclopentyl acetic acid, cyclohexyl acetic acid, cyclopentyl propionic acid and cyclohexyl propionic acid, arylalkanoic acids, such as phenyl acetic acid and phenyl propionic acid; aryl carboxylic acids, such as benzoic acid and 2,4-dinitrobenzoic acid; phenoxy alkanoic acids, such as phenoxy acetic acid, p-chlorophenoxy acetic acid, 2,4-dichlorophenoxy acetic acid, 4-tert-butylphenoxy acetic acid, 3-phenoxy propionic acid and 4-phenoxy butyric acid; heterocyclic carboxylic acids, such as furane-2-carboxylic acid, 5-tertbutylfurane-2-carboxylic acid, 5-bromo-furane-2-carboxylic acid and nicotinic acids; β-ketoalkanoic acids, such as acetylacetic acid, propionylacetic acid and butyrylacetic acid; amino acids, such as diethylaminoacetic acid and aspartic acid.

It is surprising that the imino halides of esters of penicillins such as penicillin G can be made at all. Silylation of N,N-dimethyl-aniline salt of pivalic acid with 10 percent excess of trimethyl silyl chloride in methylene chloride at −40° C gave a 98 percent silylation yield based on the NMR spectrum. If the reaction solution, however, is warmed up to room temperature, the peak of $OSiMe_3$ becomes smaller and the peak of $Cl-SiMe_3$ becomes larger. Comparison of the integral of the peaks of the 3-methyl groups of pivalic acid residue and of the $OSiMe_3$ group shows that only about 90 percent of the pivalic acid is still silylated. This shows that the silylation of a carboxyl group is a reversible process.

This difficulty is even greater with penicillin silyl esters of imino chlorides in the presence of $POCl_3$ as seen by the NMR spectra. If a 35 percent excess of chlorosilane is used for the silylation at −40° C, 93–95 percent of the carboxyl group is silylated. If this solution is warmed up to room temperature over 10 minutes and is held there for another 10 minutes, only 71–75 percent of the carboxyl group is still silylated. It is obvious that a free carboxyl group can react with $PCl_5$ or $POCl_3$ to give an acid chloride group which on alcoholysis gives an ester of 6-aminopenicillanic acid.

Another consideration is that addition of an alcohol to a solution of an imino halide of a penicillin silyl ester results primarily in substitution of an alkoxy or aralkoxy group for the halogen forming an imino ether used as an intermediate in the production of 6-amino-penicillanic acid. However, at the same time, the protective silyl group is split off. Imino chlorides are known halogenating agents which can change carboxylic acid groups into acid chlorides and the same is also possible with the excess $POCl_3$ or $PCl_5$. That such reactions take place can be seen by quenching a solution of a silyl ester of an imino chloride with water or a buffered solution of pH of 5 to 8 as only 5 to 15 percent of the penicillin is reformed together with a considerable amount of an acid chloride of the corresponding penicillin and decomposition products.

In the following examples there are described several preferred embodiments to illustrate the invention. However, it should be understood that the invention is not intended to be limited to the specific embodiments.

EXAMPLE I

Fifteen grams of the potassium salt of penicillin G were suspended in 40 cc of dry methylene chloride cooled to 13° C and 12.5 cc of dimethylaniline and 8.5 cc of trimethyl silyl chloride were added thereto. After stirring the mixture for 5 minutes, the mixture was cooled in 10 minutes to −52° C, 9 gm of $PCl_5$ were added with stirring to the mixture and the solution was allowed to rise to −40° C. After 2 hours, the reaction mixture was distilled to dryness at 0.015 mm/Hg and the residue was reslurried in 100 cc of cold carbon tetrachloride to which 0.5 cc of trimethyl silyl chloride had been added. The solid salts were filtered off and the filtrate was evaporated to dryness at a high vacuum. The residue was dissolved in 100 cc of dry carbon tetrachloride and the solution was filtered.

Peaks were seen at 3090, 3068, 3035, 2965, 2855 and 2,802 $cm^{-1}$, $-CH$ in $CH_2$ groups; at 1,792 $cm^{-1}$ $-C = O$ of β-lactam; at 1,725 $cm^{-1}$ $-C = O$ ester; at 1,678 $cm^{-1}$ $-C = N$; at 1,600 and 1,490 $cm^{-1}$ $-C = C$ aromatic; at 1,253 and 845 $cm^{-1}$ $-Si(ME)_3$; and at 1,050 $cm^{-1}$ $-C-O-Si$.

EXAMPLE II

Fifteen grams of the potassium salt of penicillin G were suspended in 40 cc of dry methylene chloride and 11.6 gm of quinoline were added thereto. After cooling the mixture to 14° C, 8.5 cc of trimethyl silylchloride were added thereto and the temperature rose to 29° C. After 1 minute, the reaction mixture was cooled in 15 minutes to −50° C and 9 gm of $PCl_5$ were added at this temperature. The reaction mixture was stirred for 3 hours at −40° to −50° C and 100 cc carbon tetrachloride at −50° C were added. The mixture was distilled at 0.012 mm Hg to remove volatile material. 100 cc of carbon tetrachloride containing 0.5 percent of trimethyl silylchloride were added to the residue and the solids were removed by filtration. The filtrate was evaporated to dryness at a high vacuum and the residue was dissolved in about 75 cc of carbon tetrachloride containing trimethyl silyl chloride and was filtered again.

The NMR spectrum of the imino chloride of penicillin G trimethyl silyl ester in carbon tetrachloride was fundamentally different than the benzylpenicillin trimethyl silyl ester per se. The most obvious difference is seen on comparison of the shift of the $CH_3$ signals at $C_3$ and of the $CH_2$ group of the side chain. For penicillin G trimethyl silyl ester, $(CH_3)_2$ δ = 1.46 ppm (6 protons), $CH_2$ δ = 3.53 ppm (2 protons) while for the imino chloride of penicillin G trimethyl silyl ester, $(CH_3)_2$ δ = 1.42 ppm (3 protons), 1.54 ppm (3 protons) and $CH_2$ δ = 3.90 ppm (2 protons). Comparison of the remaining parts of both spectra shows smaller shift differences for $OSiMe_3$, $C_2-H$ and $C_5-H$ and $C_6-H$ signals. Only the $C_6H_5$ signal is approximately equal in both spectra.

EXAMPLE III

The reaction procedure of Example I was repeated using penicillin V as the starting material to obtain the imino chloride of penicillin V trimethyl silyl ester.

EXAMPLE IV

Twenty-five cubic centimeters of n-propanol were added to 25 cc of the product of Example I at −40° C to obtain the n-propylimino ether of penicillin G.

EXAMPLE V

In a 1-liter 4-necked round bottom flask equipped with an efficient stirrer, a thermometer, a dropping funnel and a $CaCl_2$-tube, 60 g of crude milled potassium salt of penicillin G (purity about 98 percent) was suspended in a mixture of 250 ml of methylene chloride and 43 ml of N,N-dimethylaniline. The flask was cooled by water and to the suspension in the flask, 16 ml of dimethyl dichlorosilane was added via the dropping funnel within 5 minutes, so that the temperature did not rise above 27° C. The mixture was stirred another 30 minutes at about 25° C and then cooled to −50° C by means of dry ice-acetone. When this temperature was reached, 36 g of phosphorus pentachloride was added all at once whereby the temperature rose to about −40° C and this temperature was maintained for 2 hours while stirring to form the imino chloride of penicillin G trimethyl silyl ester. Thereafter the reaction mixture was cooled to −65° C. Then 8.5 ml of N,N-dimethylaniline and 250 ml of n-butanol were added within about 5 minutes. To avoid raising the temperature above −40° C, the mixture was cooled sufficiently, especially during the beginning of the addition of the butanol. The mixture must be stirred vigorously. The temperature of −40° C was then maintained during 2 hours and 30 minutes to form the n-butyl imino ether of penicillin G. The cooling bath was removed and while stirring intensively 240 ml of distilled water and then 100 ml of 4.5 N ammonia were added, both within a few minutes. Before the end of the addition of ammonia, the mixture was inoculated with about 100 mg of 6-aminopenicillanic acid. The temperature was between +5° and +10° C. Ammonium bicarbonate was slowly added over about a half hour until a pH of 4.1 was reached (abOut 35 g $NH_4HCO_3$). After cooling the mixture for 6 hours at about +5° C, it was filtered and the filter cake of 6-amino-penicillanic acid crystals was washed with 50 ml of an acetone water mixture (1:1) and then with 50 ml acetone. After drying, the yield of 6-amino-penicillanic acid was 31–32 g with a purity of 97–99 percent corresponding to 91 percent theoretical yield.

EXAMPLE VI 29.8 g of the potassium salt of benzyl penicillin (technical grade, 1,579 U.mg) were suspended in 300 ml of technical chloroform. Then, in succession, 32 ml of quinoline and 14.5 ml of dimethyldichlorosilane were added to the suspension. The temperature rose from 20.5° to 26° C. After stirring for about 40 minutes the suspension was cooled to −25° C. At this temperature 18 g of $PCl_5$ were added to form the corresponding imino chloride. After a reaction period of 3 hours, 200 ml of n-propanol were added quickly (about 4 minutes) under vigorous stirring, but in such a way that the temperature did not rise above −20° C to form the corresponding propyl imino ether. After a reaction period of 2 hours, the reaction mixture was added to 175 ml of water under stirring and the pH was brought to 4.0 by means of ammonium bicarbonate. After standing during 12 hours at 4° C, the 6-amino penicillanic acid was filtered off and washed with 65 ml of 50 percent cold methanol and 70 ml of acetone. After drying, 13.85 g (80.1 percent yield) of 6 amino penicillanic acid having a content of 2,702 U/mg were obtained.

EXAMPLE VIII

In a three-necked flask equipped with a stirrer, a dropping funnel, a thermometer and a calcium chloride tube, 14 g of technical grade penicillin V acid were dissolved in 140 ml of dry, alcohol-free chloroform, and 6.4 ml of triethylamine and 6 ml of trimethylchlorosilane were added. The temperature rose to about 30° C. After 15 minutes, 19 ml of pyridine were added and after cooling to −10° C, a solution of 12.5 g of $PCl_5$ in 260 ml of anhydrous, alcohol-free chloroform was added dropwise over about 7 minutes. Cooling was required to prevent the temperature of the mixture rising above 0°C to form the corresponding imino chloride. After 45 minutes stirring at about 0° C (−1° – +2° C) the mixture was cooled again to −10° C and then 130 ml of absolute methanol were added dropwise over 5 minutes in such a way that the temperature did not rise above 0° C to form the corresponding methylimino ether.

After a reaction time of 120 minutes, 40 ml of distilled water were added to the reaction mixture and the pH was brought to 2.0 with the aid of 6 N ammonium hydroxide. After 3 hours standing at about 5° C, the pH was brought to 4.0 with the aid of 6 N ammonium hydroxide. The next morning, the crystallized 6-aminopenicillanic acid was sucked off from the mixture, which has been stored in the ice-box, was washed with 60 percent and 100 percent methanol and dried, to obtain 3.64 g of 6-aminopenicillanic acid, (i.e. yield of 42.1 percent). According to microbiological estimation, the mother liquor still contained 4.9 percent of 6-aminopenicillanic acid.

EXAMPLE VIII 14.88 g of the potassium salt of penicillin G, suspended in 140 ml of chloroform, were converted with 6.9 ml of trimethylchlorosilane into the trimethylsilyl ester, (reaction time 92 minutes at 23°–25° C). After this, 13.6 ml of pyridine were added and the mixture was cooled to −10° C. By addition of 9 g of $PCl_5$ in 185 ml of chloroform over about 1½ minutes, the temperature rose to 0° C to form the corresponding imino chloride. After 33 minutes stirring at 0° C and cooling to −11° C, 100 ml of absolute methanol were added over about 4 minutes during which the temperature rose again to 0° C to form the corresponding methylimino ether. After a reaction time of 159 minutes at this temperature, the mixture was added to 40 ml of distilled water and the pH was brought at once to 4.0 by means of 6 N NaOH. After 20 hours storage at about 5° C, the precipitate was sucked off, washed with cold 60 percent and 100 percent methanol and dried, to obtain 4.52 g of 6-aminopenicillanic acid, (yield of 52.2 percent) having a pale yellow color. According to the estimations, the mother liquor still contained 6.2 percent of 6-aminopenicillanic acid. According to the biological estimation, the purity of the precipitate was 97.5 percent and according to the chemical analysis, it was 98.3 percent. The IR spectrum and the $R_F$ values obtained in chromatography corresponded to those of authentic 6-aminopenicillanic acid.

EXAMPLE IX 29.76 g of the potassium salt of penicillin G were converted in 50 ml of pure chloroform to which 9.2 ml of pyridine had been added with 14 ml of trimethylchlorosilane into the trimethylsilyl ester. After cooling of the solution to −30° C, in about 1 minute a solution of 18 g of $PCl_5$ in 150 ml of pure chloroform was added, during which the temperature rose to −1° C to form the corresponding imino chloride. With continued stirring, the reaction mixture was maintained for 20 minutes at a temperature of 0° C and then it was cooled to −20° C and a mixture of 150 ml of absolute ethanol and 18.4 ml of pyridine was added, viz., two-thirds of the quantity in 3 minutes, the remainder in 1 hour, while the temperature was maintained at about 0° C to form the corresponding ethylimino ether. After another 20 minutes stirring at 0° C, the reaction mixture was added with stirring to a solution of 33 g of sodium acetate trihydrate in 100 ml of water. The pH of the mixture was brought from 3.8 to 3.95 with 6 N NaOH. After 19 hours standing at about 5° C, the precipitate was drawn off, washed and dried to obtain 7.28 g of 6-aminopenicillanic acid, yield of 42.1 percent. According to analysis, the mother liquor still contained 5.9 percent of 6-aminopenicillanic acid and 1.4 percent of penicillin G.

EXAMPLE X 14.88 g of the potassium salt of penicillin G, suspended in 140 ml of pure chloroform, was converted with 6.4 ml of trimethylchlorosilane into the trimethylsilyl ester (75 minutes at 23°–25° C) After this, 13.2 ml of pyridine were added, the mixture was cooled to −18° C and over 3 minutes a solution of 9 g of PCl₅ in 185 ml of pure chloroform was added dropwise, during which the temperature rose to −3° C to form the corresponding imino chloride. After 32 minutes stirring at 0° C and cooling again to −23° C, 100 ml of n-propanol were added. After a reaction time of 197 minutes at 0° C and another 128 minutes at 7° − 9° C, the corresponding n-propyl imino ether was formed. 21 ml of water were added thereto and the pH was brought to 3.95. After 6 hours standing at 4° C, the 6-aminopenicillanic acid was sucked off, washed and dried, to obtain 2.58 g of 6-aminopenicillanic acid (29.8 percent yield). After working-up, the mother liquor was still found to contain 4.9 percent of 6-aminopenicillanic acid and 0.6 percent of benzylpenicillin.

EXAMPLE XI

The trimethylsilyl ester of benzylpenicillin, prepared from 14.88 g of the potassium salt of benzylpenicillinate and 6.4 ml of trimethylchlorosilane in 140 ml of pure chloroform, to which 13.2 ml of pyridine has been added, was converted, after cooling to −18° C with 9 g of PCl₅ in 185 ml of pure chloroform. In consequence, the temperature rose to almost 0° C to form the corresponding imino chloride. After a reaction time of 32 minutes at 0° C, the mixture was cooled again (to −20° C) upon which 100 ml of n-butanol was added. The mixture was stirred for 140 minutes at 0° C, for 85 minutes at 5° C and for 73 minutes at 12°−20° C to form the corresponding n-butylimino ether. After this, 21 ml of distilled water were added with continued stirring and the pH was brought to 3.95. After 4 hours standing at 4° C, the precipitate was sucked off, washed and dried, to obtain 2.89 g of 6-aminopenicillanic acid (yield of 33.5 percent). The mother liquor still contained 4.4 percent of 6-aminopenicillanic acid and 0.7 g of benzylpenicillin.

EXAMPLE XII

Using the procedure of Example VII, the trimethylsilyl ester of penicillin G was converted with PCl₅. This time, however, the cooled reaction mixture was converted further with 125 ml of amyl alcohol instead of n-butanol to obtain the amyl imino ether. This reaction was carried out first at 0° C (148 minutes), then at +5° C (63 minutes) and finally at +10° to 15° C (95 minutes). The product obtained was 2.78 g of 6-aminopenicillanic acid (yield of 32.2 percent). The mother liquor still contained 5.4 percent of 6-aminopenicillanic acid.

EXAMPLE XIII

A suspension of 14.88 g of the potassium salt of benzylpenicillin in 50 ml of pure methylene chloride was converted in the presence of 6.8 ml of pyridine with 6.4 ml of trimethylchlorosilane into the trimethylsilyl ester. To the solution cooled to −25° C there was added all at once a solution of 9 g of PCl₅ in 100 ml of pure methylene chloride, during which the temperature rose to −3° C. The reaction mixture was now stirred for another 12 minutes at 0° C and subsequently cooled to −30° C to form the corresponding imino chloride. At this temperature, a mixture of 6.8 g of pyridine and 100 ml of methanol was added during which the temperature rose to 0° C to form the corresponding methylimino ether. After 125 minutes, 40 ml of distilled water were added and the pH was brought to 4.0. After 24 hours standing at 5° C, the crystallized 6-aminopenicillanic acid was vacuum filtered, washed and dried, to obtain 3.48 g of 6-aminopenicillanic acid, (yield of 40.3 percent) while the mother liquor still contained 3.3 percent of it.

EXAMPLE XIV 7.44 g of the potassium salt of penicillin G were suspended in 25 ml of pure methylene chloride and to the suspension 1.6 ml of pyridine and 6.4 ml of trimethylchlorosilane were added. After cooling to 20° C, 1.9 ml of phosphorus oxychloride in 25 ml of pure methylene chloride were added dropwise to the trimethylsilyl ester formed, and the temperature was brought to room temperature (about 26° C). At this temperature, the mixture was stirred for 3¾ hours, to form the corresponding iminochloride. It was then cooled to −20° C and with continued stirring first 25 ml of methanol and subsequently a mixture of 25 ml of methanol and 4.0 ml of pyridine were added to form the corresponding methylimino ether. After 115 minutes stirring at 0° C, 20 ml of distilled water were added and the pH of the mixture was brought to 7.3. The layers were separated and the methylene chloride layer was further extracted with 5 ml of distilled water. According to the microbiological estimation, the aqueous layers thus obtained contained 6-aminopenicillanic acid.

Various modifications of the process may be made without departing from the spirit of scope thereof and it is to be understood that the invention is to be limited only as defined in the appended claims.

I claim:

1. An imino penicillin compound having a formula selected form the group consisting of

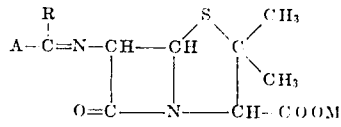

and

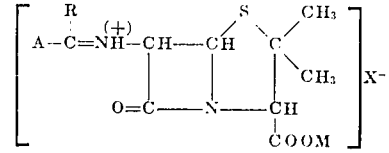

wherein A is an organic carboxylic acid radical of one to 18 carbon atoms devoid of the carboxyl group, R is selected from the group consisting of halogen and OR', R' is selected from the group consisting of alkyl of one to 12 carbon atoms, phenylalkyl of one to seven alkyl carbon atoms, cyclohexyl, hydroxyalkyl of two to 12 carbon atoms, alkoxyalkyl of three to 13 carbon atoms, monocyclic carbocyclic aryloxyalkyl of two to seven alkyl carbon atoms, monocyclic carbocyclic aralkoxyalkyl of three to seven alkyl carbon atoms and hydroxyalkoxyalkyl of four to seven carbon atoms, M is a silyl group wherein the silicon atom is substituted with members of the group consisting of lower alkyl and monocyclic carbocyclic aryl when R is halogen and hydrogen when R is OR' and X is an anion of an acid.

2. A compound of claim 1 wherein A is benzyl.
3. A compound of claim 1 wherein A is phenoxymethylene.
4. A compound of claim 1 wherein R is chlorine.
5. A compound of claim 1 wherein R is bromine.
6. A compound of claim 1 wherein R is OR' and R' is an alkyl of 1 to 18 carbon atoms.
7. A compound of claim 1 wherein R is OR' and R' is phenyalkyl of 1 to 7 alkyl carbon atoms.
8. A compound of claim 7 wherein R' is benzyl.
9. A compound of claim 1 wherein R is OR' and R' is hydroxyalkyl of two to 12 carbon atoms.
10. A compound of claim 9 wherein the hydroxyalkyl has two to eight carbon atoms.

* * * * *